United States Patent [19]
Doi et al.

[11] Patent Number: 6,035,353
[45] Date of Patent: Mar. 7, 2000

[54] COMPUTER INCLUDING DATA SIGNAL MONITORING CIRCUIT

[75] Inventors: Teruhisa Doi; Yoshiki Okumura, both of Yokohama, Japan

[73] Assignee: Fujitsu Limited, Kawasaki, Japan

[21] Appl. No.: 09/087,498

[22] Filed: May 29, 1998

[30] Foreign Application Priority Data

Oct. 29, 1997 [JP] Japan .................................. 9-297206

[51] Int. Cl.[7] .................................................. G06F 13/00
[52] U.S. Cl. ............................ 710/100; 710/129; 710/16
[58] Field of Search .................................. 710/100, 128,
710/129, 5, 15, 16, 18, 49, 262; 365/189.05,
233, 233.5; 370/363

[56] References Cited

U.S. PATENT DOCUMENTS

| | | | |
|---|---|---|---|
| 4,646,272 | 2/1987 | Takasugi | 365/233 |
| 4,766,572 | 8/1988 | Kobayashi | 365/189.05 |
| 4,873,686 | 10/1989 | Tada et al. | 714/732 |
| 4,958,271 | 9/1990 | Yoshida et al. | 710/128 |
| 5,371,716 | 12/1994 | Yamanaka | 365/233.5 |
| 5,463,740 | 10/1995 | Taniai et al. | 40/825.5 |
| 5,471,160 | 11/1995 | Higaki | 327/51 |
| 5,600,647 | 2/1997 | Murai | 370/363 |
| 5,648,931 | 7/1997 | Obara | 365/189.05 |
| 5,696,720 | 12/1997 | Lee | 365/189.05 |

FOREIGN PATENT DOCUMENTS

| | | |
|---|---|---|
| 54-68280 | 6/1979 | Japan . |
| 63-148170 | 6/1988 | Japan . |

*Primary Examiner*—Xuan M. Thai
*Attorney, Agent, or Firm*—Staas & Halsey, LLP

[57] ABSTRACT

In a system having a processor, a memory and a peripheral circuit which communicate via a common bus, a signal detector and a compression circuit are included to facilitate data monitoring by a logic simulator. The signal detector is also connected to the common bus. In monitoring a target circuit, the signal detector decodes an address of a bus signal to determine if the signal is input to/output from the target circuit. The signal detector applies mask data, stored in a mask memory, to the bus signal, except for the bus data input to/output from the target signal, to generate a masked signal. The masked signal is then compressed using the compression circuit. The data input to/output from the target circuit and the compressed, masked signal are then stored in a memory of the logic simulator. Masking and compressing the bus signals reduces the amount of data stored by the logic simulator.

13 Claims, 4 Drawing Sheets

Fig.6(a)

| ADDRESS | OUTPUT WAVEFORM DATA |
|---------|----------------------|
| AD1     | Da                   |
| AD2     | Db                   |
| ⋮       | ⋮                    |

Fig.6(b)

| OUTPUT DESTINATION | OUTPUT WAVEFORM DATA |
|--------------------|----------------------|
| MEMORY             | Da                   |
| I/O                | Db                   |
| CPU                | Dc                   |
| ⋮                  | ⋮                    |

COMPUTER INCLUDING DATA SIGNAL MONITORING CIRCUIT

BACKGROUND OF THE INVENTION

The present invention relates to a data signal monitoring method and apparatus, and more particularly, to a method and apparatus for monitoring, in a logic simulation, a data signal of a target circuit transmitted on a common bus in a system.

A microcomputer (CPU), a memory and an input/output circuit are connected to a common bus. The CPU operates according to program data stored in the memory to communicate a data signal including an instruction between the memory and the peripheral circuit.

A logic simulator is connected to the common bus to monitor whether one or more circuits operate normally. That is, the simulator monitors the data signal supplied to or output from a target circuit to check the operation of the target circuit. The simulator determines whether the monitored data signal matches an expected data signal corresponding to the operation of the system. Based on the determination result, whether the target circuit operates normally is determined.

However, because the system configuration is very complicated, many kinds of data signals are supplied on the common bus. This makes it difficult to monitor the target circuit data signal and the operation of the target circuit.

One method for monitoring a target circuit data signal traces all of the data signals on the common bus, displays the traced data signals on a CRT or other suitable display tool and separates the data signals to monitor the target circuit data signal. However, as the system configuration becomes more complicated, the system operation takes a longer time, and simulation for tracing the data signal also takes a longer time. Further, a large capacity memory is needed to trace the data signals for a long period of time. Therefore, it is disadvantageous in terms of cost and time to monitor the data signals by tracing.

An object of the present invention is to provide a method and apparatus which facilitate monitoring a data signal of a target circuit.

SUMMARY OF THE INVENTION

Briefly stated, the present invention provides, in a system having one or more circuits mutually connected via a common bus, a method for monitoring a data signal input to/output from a target circuit via the common bus. The method includes the steps of: receiving information about the target circuit; determining, based on the information about the target circuit, whether a data signal supplied on the common bus is the data signal input to/output from the target circuit; passing the data signal input to/output from the target circuit based on the result of the determination; and masking the data signal input to/output from the one or more circuits except the target circuit.

The present invention provides an apparatus for monitoring data signals supplied on a common bus which mutually connects one or more circuits. The apparatus includes a detection circuit and a masking circuit. The detection circuit is connected to the common bus. The detection circuit receives the data signals supplied on the common bus and discriminates a first data signal input to/output from a target circuit from a second data signal input to/output from the other circuits. The masking circuit masks the second data signal and generates a masked second data signal.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6(a) shows data signals stored in a trace memory and corresponding addresses in a logic simulation which receives the data signal from the system of FIG. 1; and FIG. 6(b) shows a data signal stored in a trace memory and corresponding information about an output destination circuit.

DETAILED DESCRIPTION OF THE PREFERRED EMBODIMENTS

Figure 1:
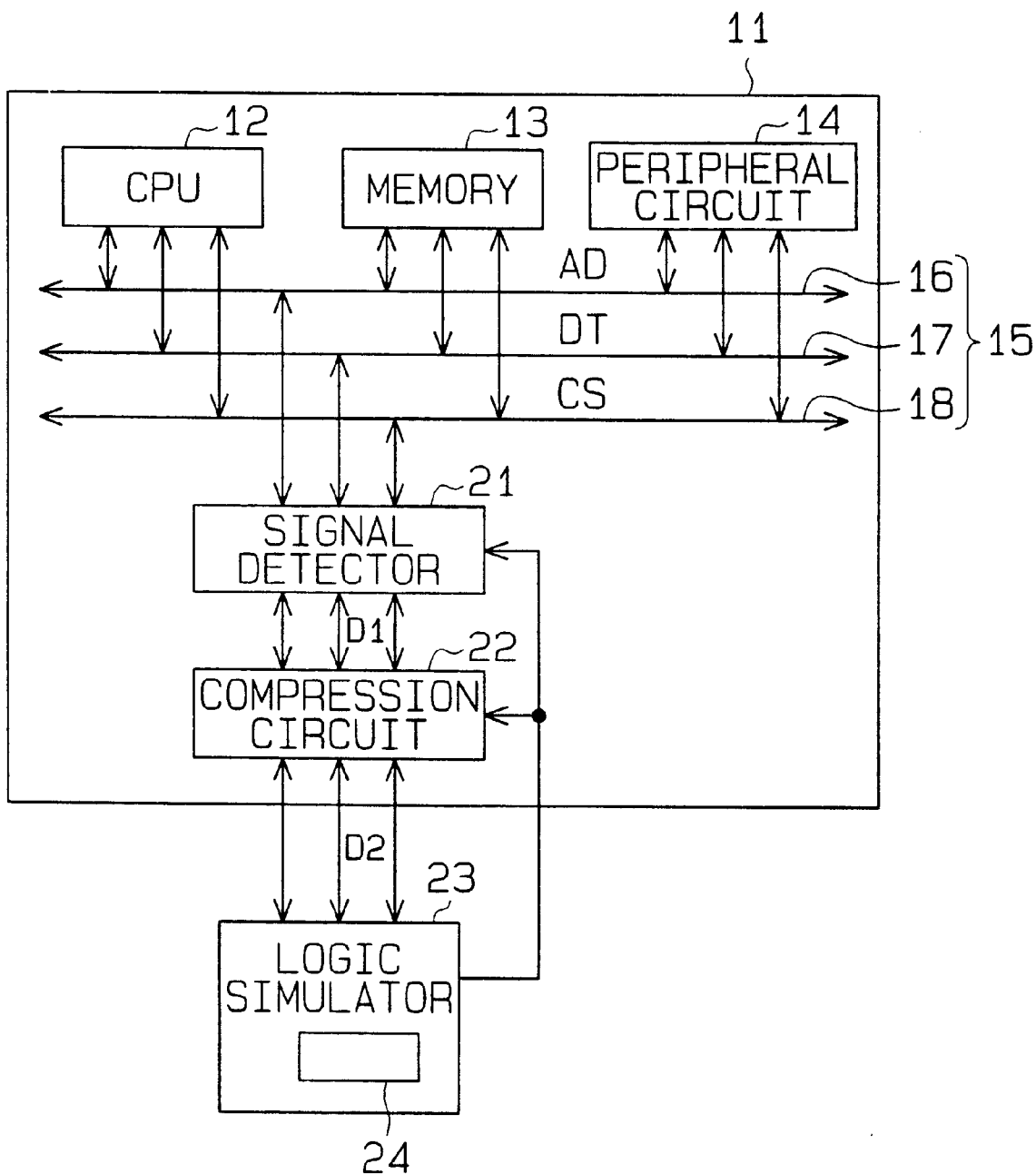
FIG. 1 is a block diagram of a data signal monitoring system according to one embodiment of the present invention.

One embodiment of the present invention is described hereinafter according to FIGS. 1–6. Referring to FIG. 1, a system 11 comprises a CPU 12, such as a microcomputer, a memory 13 and a peripheral circuit 14. The memory 13 preferably includes a program memory and a data memory. The program memory stores control program code including an execute instruction of the CPU 12 for operating the system 11. The data memory stores initial values necessary to execute the control program and temporarily stores data during processing (i.e., Program code execution). The peripheral circuit 14 includes a predetermined function circuit or a function circuit set according to the user's specifications, for example, a timer circuit or a counter circuit.

The system 11 includes a common bus 15 which mutually connects the CPU 12, the memory 13 and the peripheral circuit 14. The common bus 15 includes an address bus 16, a data bus 17 and a control bus 18. The common bus 15 allows the CPU 12, the memory 13 and the peripheral circuit 14 to communicate with each other by passing both commands and data to each other.

The CPU 12 inputs/outputs an address signal AD, a data signal DT and a control signal CS to/from the memory 13 and the peripheral circuit 14. The address signal AD is transferred on the address bus 16. The data signal DT is transferred on the data bus 17 and includes a control instruction and/or data. The control signal CS is transferred on the control bus 18 and includes an access control signal for the memory 13 and the peripheral circuit 14, a read signal, a write signal, a data acknowledge signal and a data strobe signal. Each bus 16–18 is formed from a plurality of signal lines which correspond to a number of bits, as is known to those of ordinary skill in the art.

The CPU 12 provides the address signal AD and the control signal CS to the memory 13 and the peripheral circuit 14 via the common bus 15 and selects a target circuit to input/output the data signal DT. The CPU 12 inputs/outputs the data signal DT to/from the target circuit (the memory 13 or the peripheral circuit 14) via the common bus 15.

Specifically, the CPU 12 first sends the address signal AD on the address bus 16 to select the memory 13 or peripheral circuit 14. The CPU 12 then sends the control signal CS on the control bus 18 to set operation of the memory 13 or peripheral circuit 14. The CPU 12 finally sends the data signal DT on the data bus 17 to transfer the data signal DT output from the memory 13 or the peripheral circuit 14, of course, as will be understood by those of ordinary skill in the art, the address signal AD, the control signal CS and the data signal DT may be placed on the respective busses 16–18 substantially simultaneously.

The system 11 further comprises a signal detector 21 as a masking circuit and a compression circuit 22 as a signal compressor. A logic simulator 23 is connected to the common bus 15 via the compression circuit 22 and the signal detector 21. The logic simulator 23 simulates operation of the system 11. The logic simulator 23 receives the data signal DT output on the data bus 17 via the signal detector 21 and the compression circuit 22.

The signal detector 21 masks the data signal DT input to/output from non-target circuits among those supplied on the data bus 17 and sends the masked data signal DT to the compression circuit 22. Masking of the data signal DT by the signal detector 21 facilitates monitoring the data signal DT.

Figure 2:
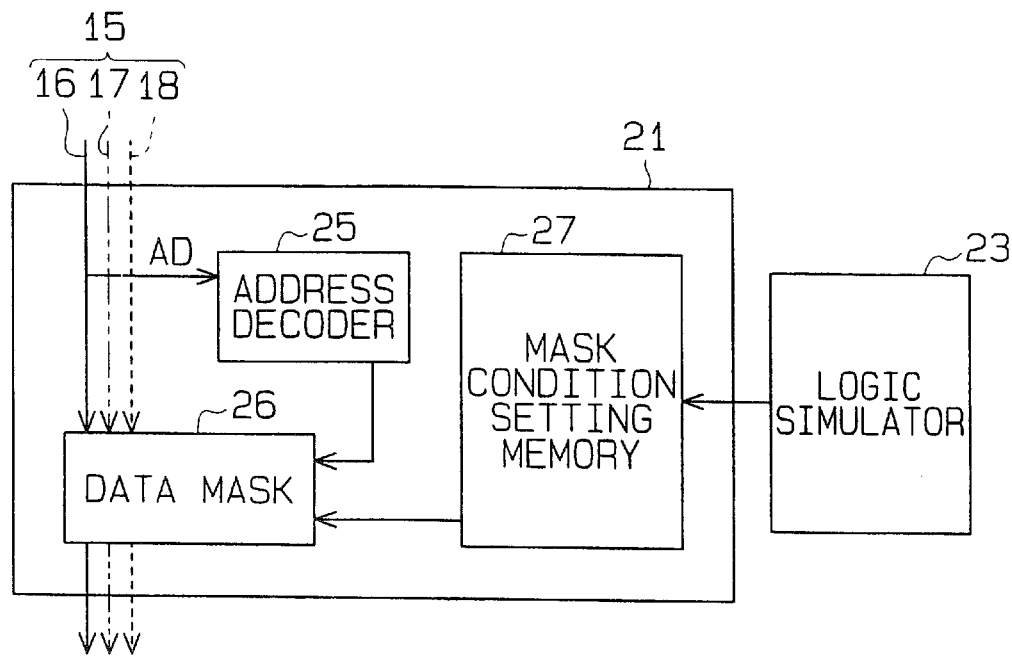
FIG. 2 is a block diagram of a signal detector in the system of FIG. 1.

Referring to FIG. 2, the signal detector 21 comprises an address decoder 25, a data mask unit 26 and a mask condition setting memory 27. The mask memory 27 stores information corresponding to the data signal DT input to/output from the selected target circuit, which is supplied from the logic simulator 23. That is, the logic simulator 23 sends predetermined information to the signal detector 21 to select the data signal DT input to/output from the target circuit (the memory 13 or the peripheral circuit 14) for the purpose of checking the operation of the target circuit, of course, even the CPU 12 could be designated as the target circuit.

The information includes information about the address signal AD to select a target circuit, information indicating the state on the data bus 17 over which the target data signal DT is transferred (e.g., the level of the control signal CS) and information to set a masking level.

The address decoder 25 receives the address signal AD supplied on the address bus 16 and decodes the signal AD. The decoded address signal is supplied to the mask unit 26. The mask unit 26 receives each signal supplied on the busses 16–17, as well as the decoded address signal from the address decoder 25. The mask unit 26 further receives the mask information stored in the mask memory 27. In this case, the information includes address information specifying the target circuit and information to indicate the timing to receive the data signal DT (i.e., the information about the level of the control signal CS).

Figure 3:
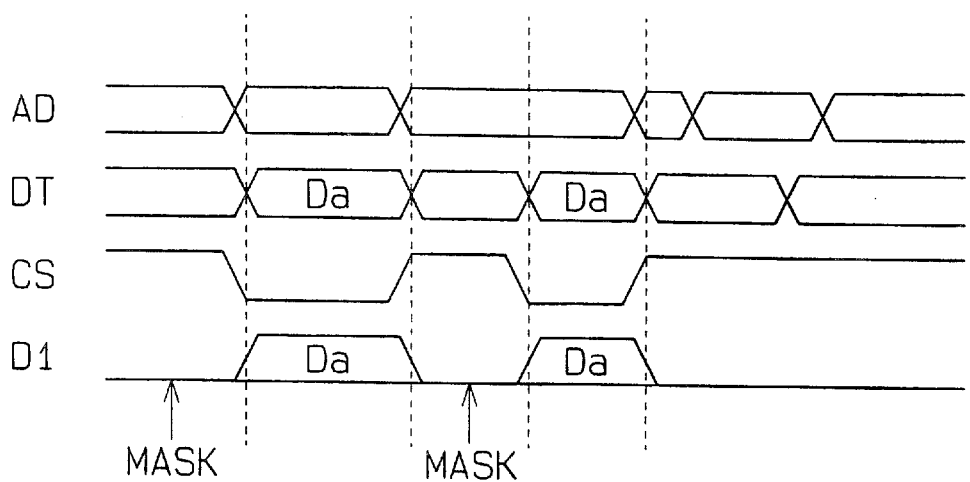
FIG. 3 is a waveform diagram of data signals output from the signal detector of FIG. 2.

The mask unit 26 compares the decoded address signal with the address information from the mask memory 27 and determines whether the current input data signal DT is the target data signal. Referring to FIGS. 1 and 3, the mask unit 26 outputs a masked data signal D1 when the control signal CS has a specified level. If the current data signal DT is not the target data signal, the mask unit 26 outputs the masked data signal D1 having a certain level according to the level information stored in the mask memory 27. In the present embodiment, the target data signal is output when the control signal CS has a low (L) level. Alternatively, the target data signal output condition may be determined by a combination of two or more control signals having predetermined levels. The condition may also be determined by the result of comparing the address signal AD with the address information or by the level of the control signal CS.

The level of the masked data signal D1 is high (H) level, low (L) level or intermediate (Z) level. The mask memory 27 stores information corresponding to the signal levels.

Figure 4:
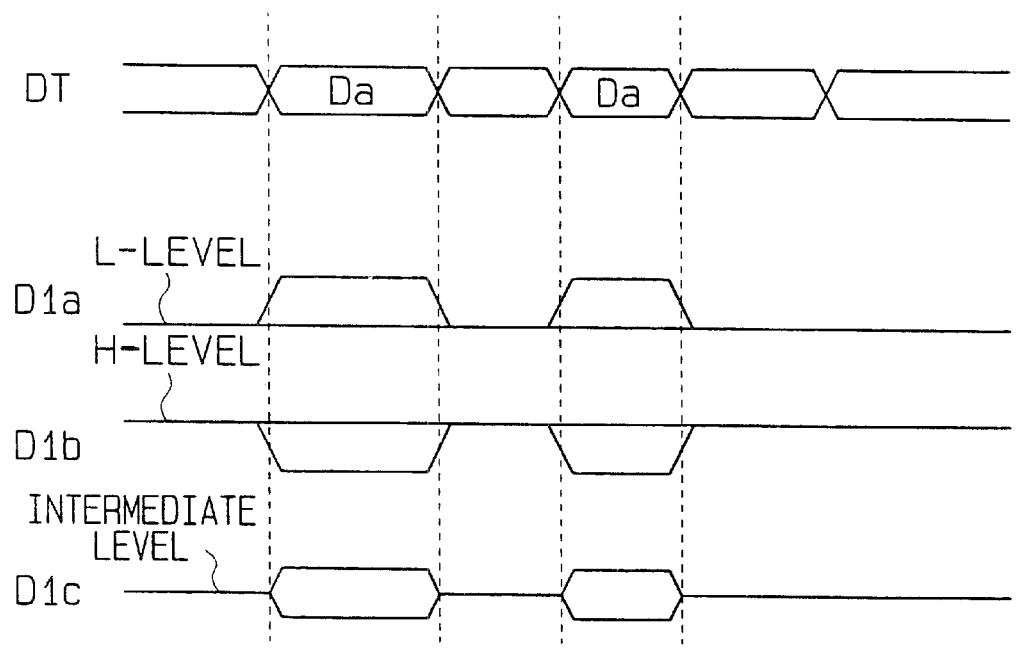
FIG. 4 is a waveform diagram of data signals output from the signal detector of FIG. 2.

Referring to FIG. 4, the mask unit 26 outputs the masked data signal D1a having an L level according to the information indicating the L level. The mask unit 26 outputs the masked data signal D1b having an H level according to the information indicating the H level. The mask unit 26 further outputs the masked data signal D1c having an intermediate level between the H level and the L level according to the information indicating the Z level. The data signal D1c having the intermediate level is output when the output terminal of the mask unit 26 is in the high impedance state. Changing the masked data signal level allows the target data signal D1 to be definitely discriminated from the masked data signal D1. For example, when the target data signal has an L level, the mask unit 26 outputs the masked data signal D1 having an H level, thereby definitely discriminating the target data signal from the masked data signal D1. This facilitates monitoring the target data signal.

Thus, the signals transferred on the bus 15 are input to the signal detector 21. The address signal AD is input to the address decoder 25 to determine whether the data on the bus 15 pertains to the selected target circuit and is to be considered as a target data signal. The data mask unit 26 receives the bus 15 data, the decoded address, and the mask information stored in the mask memory 27 and, if the bus 15 data signal is not directed to/from the target circuit, then the mask is applied to the bus data signal and the mask data signal D1 is generated.

Figure 5:
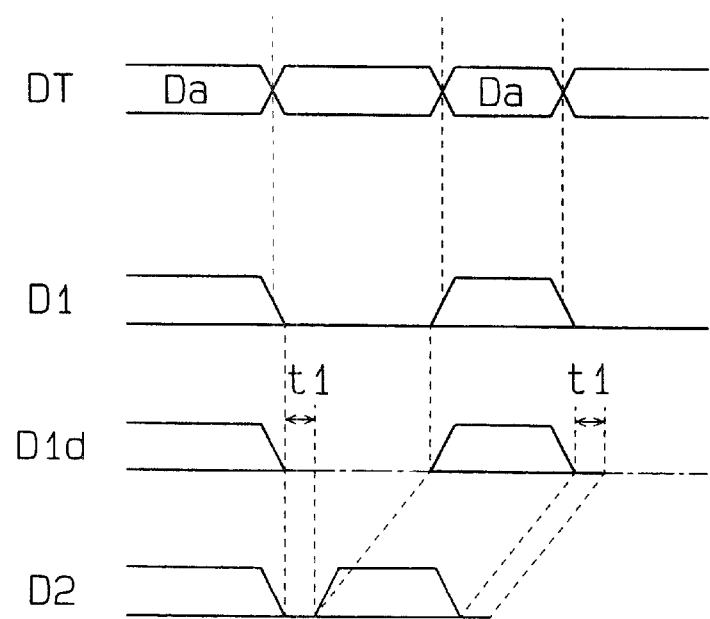
FIG. 5 is a waveforms diagram of data signals supplied to a compression circuit in the system of FIG. 1, a data signal processed in the compression circuit and a data signal output from the compression circuit.

The masked data signal D1 is input to the compression circuit 22 (FIG. 1). Referring to FIG. 5, DT indicates the target data signal on the data bus 17. D1 shows the corresponding masked data signal. In FIG. 5, the masked data signal D1 corresponds to the data signal DT in the first and third cycles and has masked data at the second cycle. The compression circuit 22 compresses the masked data signal D1 to generate a compressed masked data signal D2 by outputting the masked data (i.e. at the second cycle) only for a predetermined limited time period. In the example, the predetermined limited time period is shown as t1. After the predetermined time period t1 has ended, the compression circuit 22 stops outputting the masked data portion of the masked data signal D1. The predetermined time period t1 is preferably set to a time long enough to discriminate the next target data signal D1. The compressed masked data signal D2 is then supplied to the logic simulator 23.

The logic simulator 23 receives the compressed masked data signal D2. As discussed above, the compressed masked data signal D2 includes the desired target data (indicated as Da in FIG. 5) and the compressed masked data (which spans the time period t1 in FIG. 5). The logic simulator 23 stores the compressed masked data signal D2 preferably in sequential locations of a trace memory 24 (FIG. 1). By masking the data on the bus 15 and then compressing the data sent to the logic simulator 23 prior to storing such data, the memory size requirements of the trace memory 24 are decreased.

Thus, a large amount of desired data can be stored in the trace memory 24. As a result, it is possible to simulate and monitor signal waveforms of a target circuit for a long period of time.

Referring now to FIGS. 6(*a*) and 6(*b*), the compressed data signal D2 is preferably stored in the trace memory 24 in a location corresponding to its output destination address (FIG. 6(*a*)), or alternatively, in a location corresponding to the destination circuit (FIG. 6(*b*)).

As described above, the data signals input to/output from the circuits except the target circuit are masked, the data signal input to/output from the target circuit is easily identified. By changing properly the information about the target circuit stored in the mask memory 27, the data signal input to/output from a desired target circuit is selectively identified. Further, by changing properly the masking level information stored in the mask memory 27, the data signal DT input to/output from the target circuit is easily discriminated from the masked data signal D1. As the masked data signal D1 is compressed by the compression circuit 22, the amount of data supplied to the logic simulator 23 is decreased, allowing a large amount of desired data to be stored in the trace memory 24, so that it is possible to simulate and monitor the signal waveforms for a long time.

It should be apparent to those skilled in the art that the present invention may be embodied in many other specific forms without departing from the spirit or scope of the invention. Particularly, it should be understood that the invention may be embodied in the following forms. For example, instead of the system 11 including the signal detector 21 and the compression circuit 22, the logic simulator 23 may have a signal detector 21 and a compression circuit 22. The system 11 may have a signal detector 21 and the logic simulator may have a compression circuit 22. Further, the compression circuit 22 may be omitted depending on the size of the logic simulator memory 27. Also, it will be understood by those of ordinary skill in the art that the common bus 15 may include other schemes/protocols for allowing communication between the devices connected to it. Therefore, the present examples and embodiments are to be considered as illustrative and not restrictive and the invention is not to be limited to the details given herein, but may be modified within the scope and equivalence of the appended claims.

What is claimed is:

1. In a system having one or more circuits mutually connected via a common bus, a method for monitoring data signals input to/output from a target circuit via the common bus, comprising:

receiving information about the target circuit;

determining, based on the information about the target circuit, whether a data signal suppled on the common bus is the data signal input to/output from the target circuit;

passing the data signal input to/output from the target circuit based on the result of the determination; and masking the data signal input to/output from the one or more circuits except the target circuit.

2. The method of claim 1, wherein masking the data signal includes generating a data signal having a predetermined level to mask the data signal.

3. The method of claim 2, further comprising compressing the masked signal having the predetermined level.

4. The method of claim 3, further comprising storing the compressed masked data signal.

5. An apparatus monitoring data signals supplied on a common bus which mutually connects one or more circuits, comprising:

a detection circuit, connected to the common bus, receiving the data signals supplied on the common bus and discriminating a first data signal input to/output from a target circuit from a second data signal input to/output from the other circuits; and a masking circuit which masks the second data signal and generates a masked second data signal.

6. The apparatus of claim 5, wherein the masking circuit receives information about the target circuit and the first data signal and masks the second data signal based on the information.

7. The apparatus of claim 6, wherein the information about the first data signal includes address information of the target circuit, and the detection circuit discriminates the first data signal from the second data signal by comparing the address information with an address signal supplied on the common bus.

8. The apparatus of claim 5, wherein the masking circuit masks the second data signal to generate a masked second data signal having a predetermined level.

9. The apparatus of claim 5, further comprising a memory to store the first and second data signals.

10. The apparatus of claim 5, further comprising:

a compression circuit which receives the first data signal and the masked second data signal from the detection circuit and compresses the masked second data signal; and a memory storing the first data signal and the compressed masked second data signal.

11. A computer system connectable to a data monitor which monitors a target circuit of the computer system, comprising:

a processor performing arithmetic operations;

a memory storing at least one of a program code and data;

a peripheral circuit performing predetermined operations;

a common bus connecting the processor, the memory and the peripheral circuit and allowing the processor, the memory and the peripheral circuit to communicate with each other; and a signal detection circuit connected to the common bus monitoring bus traffic and detecting the bus traffic input to or output from the target circuit such that when the data monitor is connected to the computer system by way of the signal detection circuit, the data monitor only receives the bus traffic input to and output from the target circuit.

12. The computer system of claim 11, wherein the signal detection circuit includes a compression circuit which compresses the detected bus traffic to generate a compressed signal and passes the compressed signal to the data monitor.

13. The computer system of claim 11, wherein the target circuit is one of the memory and the peripheral circuit.

\* \* \* \* \*